2,851,497

PROCESS FOR CONVERTING METHYL ISOPROPENYL KETONE TO ITS CYCLIC DIMER

Duane L. Stearns and Walter E. Heinz, Corpus Christi, Tex., assignors to Celanese Corporation of America, New York, N. Y., a corporation of Delaware No Drawing. Application October 12, 1954
Serial No. 461,926

2 Claims. (Cl. 260—593)

This invention relates to methyl isopropenyl ketone and relates more particularly to an improved process for the storage of methyl isopropenyl ketone and for the conversion of the dimer of methyl isopropenyl ketone to its monomer.

Methyl isopropenyl ketone in storage tends to polymerize and also to react with itself to produce a cyclic dimer. The polymerization of the methyl isopropenyl ketone can be effectively prevented by storing the same under a blanket of inert gas, such as nitrogen, methane, or the like, and by adding to the methyl isopropenyl ketone a small proportion of a polymerization inhibitor, such as hydroquinone. None of these expedients, however, will prevent the reaction of the methyl isopropenyl ketone with itself to produce a cyclic dimer. The formation of the dimer can be slowed down or prevented by holding the methyl isopropenyl ketone at a reduced temperature of 0° C. or less. The expense of storing and shipping the methyl isopropenyl ketone at such low temperatures is considerable and adds materially to the cost of manufacturing and distributing the same.

It is an important object of this invention to provide a process for the storage of methyl isopropenyl ketone which will be free from the foregoing and other disadvantages.

A further object of this invention is to provide a process for the storage of methyl isopropenyl ketone in which the methyl isopropenyl ketone is stored in the form of its cyclic dimer and converted to the monomer before use.

Another object of this invention is to provide a process for the conversion of the dimer of methyl isopropenyl ketone to its monomer.

Other objects of this invention will be apparent from the following detailed description and claims.

According to one aspect of this invention, methyl isopropenyl ketone is stored in the form of its cyclic dimer which is converted to the monomer before use. The cyclic dimer of the methyl isopropenyl ketone may be prepared simply by permitting the said ketone to stand at normal temperatures until the dimer has formed, care being taken during this period to prevent the polymerization of the methyl isopropenyl ketone by having present a polymerization inhibitor and, if desired, by blanketing the same with an inert gas. However, it is preferred to prepare the cyclic dimer of the methyl isopropenyl ketone by holding the same at an elevated temperature until the dimer has been formed. In this case also, care should be taken to have present a polymerization inhibitor to prevent the polymerization of the ketone and, if desired, to blanket the methyl isopropenyl ketone with an inert gas. The cyclic dimer of the methyl isopropenyl ketone is stable and shows no tendency to polymerize so that it may be stored for extended periods of time without special precautions. It may, however, be desirable in storing the dimer to have present a polymerization inhibitor and to blanket the same with an inert gas to prevent the polymerization of any methyl isopropenyl ketone present therein. When it is desired to employ the methyl isopropenyl ketone, the stored dimer may be readily converted to the monomer.

According to another aspect of this invention, the cyclic dimer of methyl isopropenyl ketone, whether prepared by intent or formed spontaneously during the storage of methyl isopropenyl ketone, is converted to the monomer by heating the same in the vapor phase to a temperature of at least about 375° C., or preferably between about 420 and 520° C. in the absence of a catalyst mass. The conversion of the dimer to the monomer under these conditions proceeds rapidly and with high rates of conversion to give an almost quantitative yield of the monomer. As a result, the recovery of the monomer from the dimer that has been formed spontaneously during storage, or that has been intentionally prepared may be carried out without involving any appreciable loss of materials.

In carrying out the preparation of the cyclic dimer of methyl isopropenyl ketone, the ketone is heated to an elevated temperature of at least about 50° C., or preferably to the reflux temperature, and held at this temperature until the cyclic dimer is formed. At the reflux temperature, the conversion of the major portion of the methyl isopropenyl ketone to its dimer will be completed in from about 48 to 60 hours, longer times being, of course, required at lower temperatures. The rate at which the dimer is formed may be significantly increased by the presence of a metal, such as copper, in a form having an extended surface area such as turnings, wire or shot. During the formation of the cyclic dimer, there should be present in the methyl isopropenyl ketone a small proportion, ranging from about 10 to 200 p. p. m. of a polymerization inhibitor such as hydroquinone, thiodiphenyl amine or sulfur. The presence of the polymerization inhibitor helps prevent the linear polymerization of the methyl isopropenyl ketone during the formation of the dimer. Further to assist in preventing the linear polymerization of the methyl isopropenyl ketone, it is desirable to carry out the formation of the dimer under a blanket of inert gas. Under these conditions, the yield of dimer may range up to 99%, or even more, with conversions of up to 81%, or even more.

When it is desired to employ the methyl isopropenyl ketone, the cyclic dimer, whether formed in the manner described above or in any other manner, is heated in the vapor phase to a temperature of at least about 375° C., or preferably to between about 420 and 520° C., in the absence of a catalyst mass. Advantageously, during the heating there is mixed with each volume of the dimer from about 2 to 200 volumes of an inert, diluent, such as steam, nitrogen, or the like. The dimer should flow through the heating zone at a space velocity of between about 20 and 100, or preferably between about 25 and 75 reciprocal hours (measured on the dimer alone). Under these conditions, the yield of methyl isopropenyl ketone will range up to about 97%, or even more, with a conversion of up to about 99%, or even more. The methyl isopropenyl ketone formed is cooled, as in a condenser, and recovered in liquid form.

The following examples are given to illustrate this invention further.

*Example 1*

Methyl isopropenyl ketone containing 150 p. p. m. of hydroquinone is refluxed for 37 hours in the presence of a mass of copper turnings. At the outset, the reflux temperature is 82° C. and the said temperature increases gradually to 102° C. Analysis of the mixture shows that 81% of the methyl isopropenyl ketone has been converted to its cyclic dimer with an efficiency of 99%. The polymer concentration of the reaction mixture is less than 1% by weight.

*Example II*

The process of Example I is repeated, omitting the copper turnings and continuing the refluxing for 50 hours. At the end of this period, it is found that 80% of the methyl isopropenyl ketone has been converted to its cyclic dimer with an efficiency of 99%. The polymer concentration of the reaction mixture is less than 1% by weight.

*Example III*

Methyl isopropenyl ketone containing 10 p. p. m. hydroquinone is stored in a glass container filled with copper turnings and shielded from the light. After 184 days, it is found that 46.8% of the methyl isopropenyl ketone has been converted to its cyclic dimer and less than 1% has polymerized to higher molecular weight products.

*Example IV*

The cyclic dimer prepared in Example I is stored for several months and is then vaporized, preheated to 400° C., mixed with 3 volumes of nitrogen for each volume of dimer and passed through an unpacked tubular reactor maintained at 448° C. at a space velocity of 49 reciprocal hours. The conversion of the cyclic dimer is 100% with an efficiency to methyl isopropenyl ketone of 96.6%. Less than 1% of polymer is formed.

*Example V*

The cyclic dimer prepared in Example I, together with sufficient water to give 24 volumes of steam for each volume of dimer is vaporized, preheated to 400° C., and passed through an unpacked tubular reactor maintained at 495–510° C. at a space velocity of 73 reciprocal hours. The conversion of the cyclic dimer is 99.5% with an efficiency to methyl isopropenyl ketone of 94.2%. About 1.6% of polymer is formed.

It is to be understood that the foregoing detailed description is given merely by way of illustration and that many variations may be made therein without departing from the spirit of our invention.

Having described our invention, what we desire to secure by Letters Patent is:

1. Process for converting methyl isopropenyl ketone to its cyclic dimer which comprises heating the same to the reflux in the presence of copper having an extended surface area.

2. The process for the storage of methyl isopropenyl ketone which comprises storing methyl isopropenyl ketone in a container in the presence of copper having an extended surface area.

References Cited in the file of this patent

UNITED STATES PATENTS 2,577,445     Bortnick _____ Dec. 4, 1951

OTHER REFERENCES

Alder et al.: Ber. Deut. Chem., vol. 74, pp. 905–11, 920–23 (1941).

Colonge et al.: Chem. Abstracts, vol. 43, pp. 5023–4 (1949).